United States Patent [19]
Kameyama

[11] Patent Number: 5,277,499
[45] Date of Patent: Jan. 11, 1994

[54] DYNAMIC PRESSURE BEARING APPARATUS

[75] Inventor: Toru Kameyama, Tokyo, Japan

[73] Assignee: Canon Kabushiki Kaisha, Tokyo, Japan

[21] Appl. No.: 90,623

[22] Filed: Jul. 12, 1993

Related U.S. Application Data

[63] Continuation of Ser. No. 769,372, Oct. 1, 1991, abandoned.

Foreign Application Priority Data

Oct. 4, 1990 [JP] Japan ................. 2-265087

[51] Int. Cl.⁵ .............................. F16C 17/10
[52] U.S. Cl. ........................ 384/123; 384/112; 384/245
[58] Field of Search ............ 384/123, 245, 112, 113, 384/107

[56] References Cited

U.S. PATENT DOCUMENTS 4,798,476 1/1989 Sakatani et al. ............. 384/245

FOREIGN PATENT DOCUMENTS 0029667 6/1981 European Pat. Off. .
0117873 9/1984 European Pat. Off. .
0349260 1/1990 European Pat. Off. .

*Primary Examiner*—Lenard A. Footland
*Attorney, Agent, or Firm*—Fitzpatrick, Cella, Harper & Scinto

[57] ABSTRACT

In a dynamic pressure bearing apparatus for use in a rotary polygonal mirror type light deflector in a laser beam printer, a rotary head in a video tape recorder and the like, the apparatus includes a rotary shaft having a shaft end surface, a sleeve for rotatably supporting the rotary shaft through fluid, and a generator for generating dynamic pressure in a thrust direction. The sleeve has an end portion with a thrust receiver surface opposed to the shaft end surface. The dynamic pressure generator is formed on the thrust receiver surface. One of either the shaft end surface and the thrust receiver surface is convexly shaped for tolerating a non-flat surface of the shaft end surface and the thrust receiver surface.

18 Claims, 4 Drawing Sheets

FIG. IA
PRIOR ART
FIG. IB
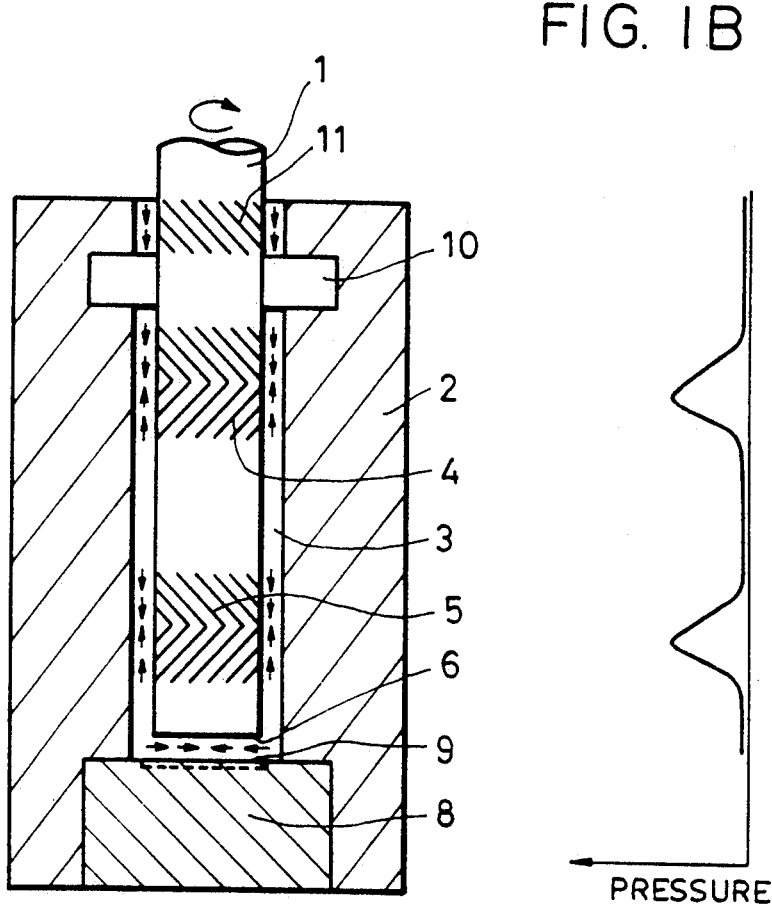
PRESSURE
FIG. IC
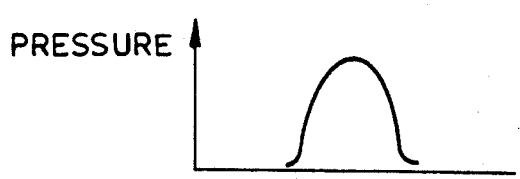

DYNAMIC PRESSURE BEARING APPARATUS

This application is a continuation of application Ser. No. 07/769,372, filed Oct. 1, 1991, now abandoned.

BACKGROUND OF THE INVENTION

1. Field of the Invention

This invention relates to a dynamic pressure bearing apparatus, and more particularly, to a bearing apparatus suitable for bearings to be used in a rotatry unit such as a rotary polygonal mirror type light deflector in a laser beam printer, a rotary head in a video tape recorder and the like.

2. Related Background Art

Conventionally, there has been presented a dynamic pressure bearing apparatus as shown in FIG. 1A. In this apparatus, a shaft 1 which rotates while supporting a rotary unit is rotatably mounted into a sleeve 2 in fluid such as lubricating oil. On the cylindrical surface of the shaft 1 (hereinafter referred to as a radial surface), first shallow grooves of a herringbone shape 4 and 5 are formed. When the shaft 1 is rotated, a dynamic pressure in a radial direction (a direction directed to an outer periphery from a central axis) occurs. As a result, a non-contact state between the shaft 1 and the sleeve 2 is maintained with respect to the radial direction. A distribution profile of the dynamic pressure in the radial direction is illustrated in FIG. 1B. A bottom surface of the sleeve 2 opposed to the end surface 6 of the shaft 1 is defined by an insert member 8 fitted into a bottom recess of the sleeve 2. On the surface of the insert member 8, a second shallow groove 9 of a spiral shape is formed so that a dynamic pressure in a thrust direction occurs when the shaft 1 is rotated. Thus, also with respect to the thrust direction, a non-contact state is maintained between the shaft 1 and the sleeve 2. A distribution profile of the dynamic pressure in the thrust direction is illustrated in FIG. 1C.

An inner groove 10 is formed in an inner side wall of the sleeve 2 near an opening end. A third shallow groove 11 of a spiral shape is formed on a portion of the radial surface of the shaft 1 located nearer to the opening end than the inner groove 10. As a result, when the shaft 1 is rotated, the third shallow groove 11 acts to feed the fluid 3 from the opening end of the sleeve 2 to the inner groove 10 with pressure so that the fluid 3 is prevented from spilling from the opening end of the sleeve 2.

In the prior art apparatus, however, when the shaft 1 is rotated, a pressure in the thrust direction is also produced by the second shallow groove 9 spirally formed on the insert member 8. Therefore, in order to maintain the non-contact state of the shaft 1 by floating the shaft 1 above the insert member 8, the degree of square, i.e., the flatness, of the surface of the insert member 8 on which the shallow groove 9 is formed, with respect to the center axis of an inner diameter of the sleeve 2, need be high. At the same time, the degree of square of the end surface 6 of the shaft 1 which is opposed to the surface of the insert member 8, with respect to the center axis of the shaft 1, should be high.

If those degrees of square are insufficient, a floating force becomes weak, and simultaneously a peripheral edge of the shaft end 6 strikes the surface of the insert member 8. Thus, the speed of rotation is disturbed and the axis tilts. This produces negative influences on the rotary polygonal mirror type light deflector, as opposed to the desired high rotational accuracy.

In general, it is required that the degree of square of the surface of the insert member 8 on which the shallow groove 9 is formed be 2-3 μm, and that of the end surface 6 of the shaft 1 also be 2-3 μm. This linear measurement is the difference between the highest and lowest points on the end surface. Therefore, a high precision operation is needed for fabricating the insert member 8 and the sleeve 2, thus making the costs of these components quite high. Further, there is also a problem that it is difficult to make the insert member 8 with plastics, which is very effective to reduce the cost of a dynamic pressure bearing apparatus.

SUMMARY OF THE INVENTION

An object of the present invention is to provide a dynamic pressure bearing apparatus which prevents a striking of a rotary shaft and generates a sufficient floating force without requiring high precision machining for obtaining a high degree of square on the end surface of the shaft and a thrust receiver surface.

According to one aspect of a dynamic pressure bearing apparatus of the present invention, the apparatus comprises a rotary shaft having a shaft end surface and a radial surface, a sleeve for rotatably supporting the rotary shaft in a fluid, and first generating means for generating a dynamic pressure in a thrust direction. The sleeve has an end portion with a thrust receiver surface facing the shaft end surface. The first dynamic pressure generating means is formed on the thrust receiver surface. One of the shaft end surface and the thrust receiver surface is shaped into a convex form having a central portion forming its highest point and being surrounded by a peripheral portion. A second generating means for generating a dynamic pressure in a radial direction may be formed on the radial surface of the rotary shaft.

According to another aspect of a dynamic pressure bearing apparatus of the present invention, the apparatus comprises a rotary shaft having a shaft end surface, a sleeve for rotatably supporting the rotary shaft and having a thrust receiver surface facing the shaft end surface, and generating means for generating a dynamic pressure in a thrust direction. One of the shaft end surface and the thrust receiver surface is shaped into a convex form.

These advantages and others will be more readily understood in connection with the following detailed description of the preferred embodiment in conjunction with the drawings.

BRIEF DESCRIPTION OF THE DRAWINGS

FIG. 1A is a cross-sectional view of a prior art dynamic pressure bearing apparatus.

FIG. 1B is a representation illustrating a generation of pressure in a radial direction in the dynamic pressure bearing of FIG. 1A.

FIG. 1C is a representation illustrating a generation of pressure in a thrust direction in the dynamic pressure bearing of FIG. 1A.

FIG. 4A is a partial view for explaining the operation of the first embodiment of FIG. 2 in a second special case.

DESCRIPTION OF THE PREFERRED EMBODIMENT

Figure 2:
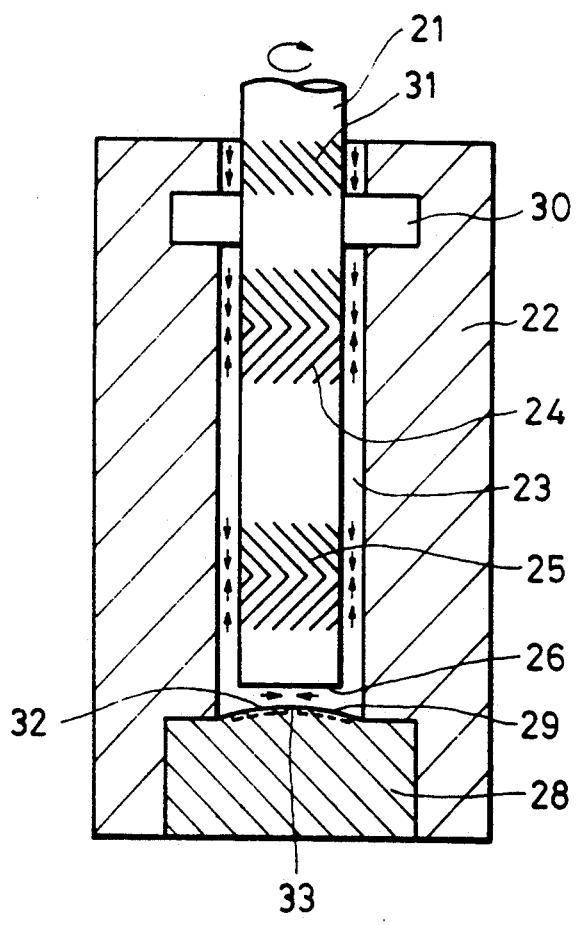
FIG. 2 is a cross-sectional view of a first embodiment of a dynamic pressure bearing apparatus according to the present invention.
Figure 3:
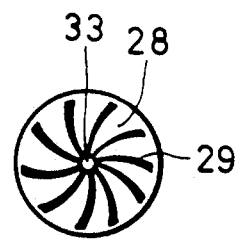
FIG. 3 is a plan view of an insert member used in the first embodiment of FIG. 2.

FIGS. 2 and 3 show the structure of a first embodiment of the present invention.

In FIG. 2, a shaft 21 rotates while supporting a rotary unit such as a polygonal scanner mirror, and the shaft 21 is rotatably mounted into a sleeve 22 through fluid 23 such as lubricating oil. On the radial surface of the shaft 21, first shallow grooves 24 and 25 of a herringbone shape are formed, and their depths are about 2-20 $\mu$m. Opposed to an end surface 26 of the shaft 21, an insert member 28 is fitted into a bottom recess of the sleeve 22 to form an inner bottom surface. On the surface of the insert member 28, a second shallow groove 29 of a spiral shape is formed as shown in FIG. 3. Its depth is about 2-20 $\mu$m.

In the inner portion of the sleeve 22 near its opening end, an annular groove 30 of a depth of about 0.01-2 mm is formed. On the radial surface of the shaft 21 nearer to the opening end than the inner groove 30, a third shallow groove 31 is formed of a spiral shape having a depth of about 2-20 $\mu$m.

The surface of the insert member 28 opposed to the shaft end surface 26 (referred to as a thrust receiver surface 32) has a convex shape, in which a central portion 33 projects toward the shaft end surface 26 to form a crown shape. The groove 29 is not formed on the central portion 33 of the thrust receiver surface 32. FIG. 3 shows a view of the thrust receiver surface 32 viewed along the shaft 21.

The operation of the first embodiment will be explained below.

When the shaft 21 rotates, a dynamic pressure in the radial direction is generated by the action of the first shallow grooves 24 and 25 (see the pressure curve shown in FIG. 1B). Due to the dynamic pressure, the shaft 21 and the sleeve 22 are maintained in a non-contact state with each other. At the same time, a dynamic pressure in the thrust direction is generated by the dint of the second shallow groove 29 (see the pressure curve shown in FIG. 1C), and due to this dynamic pressure the shaft 21 floats above the thrust receiver surface 32. Thus, the shaft 21 and the thrust receiver surface 32 are maintainedin a non-contact state with each other.

Figure 4A:
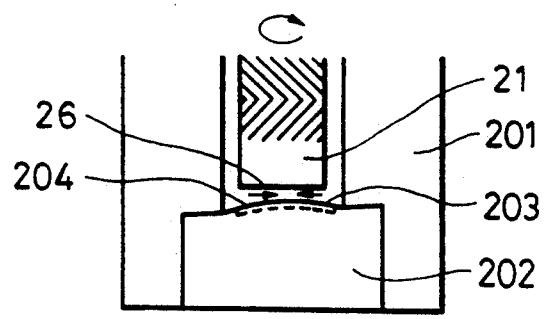
FIG. 4A is a partial view for explaining the operation of the first embodiment of FIG. 2 in a first special case.

Next, FIG. 4A shows a case where the surface of an insert member 202 is inclined relative to the inner diameter center axis of a sleeve 201. Reference numeral 203 is the second shallow groove, and reference numeral 204 is the thrust receiver surface.

Even when the thrust receiver surface 204 is inclined, a position where the thrust receiver surface 204 and the shaft end surface 26 are nearest to each other is in the vicinity of the center portion of the thrust receiver surface 204 since the thrust receiver surface 204 has a crown shape. As a result, the necessary dynamic pressure in the thrust direction is generated even in this case when the shaft 21 rotates, and hence the shaft 21 is maintained in the non-contact state with the thrust receiver surface 204.

Figure 4B:
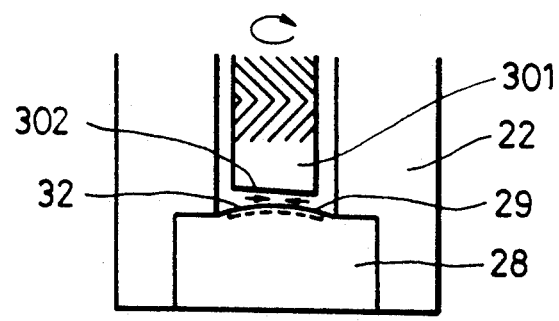

FIG. 4B shows another case that a shaft end surface 302 is inclined relative to the center axis of a shaft 301, in the structure of the first embodiment.

Even when the shaft end surface 302 is inclined, a position where the thrust receiver surface 32 and the shaft end surface 302 are nearest to each other is in the vicinity of the center portion of the thrust receiver surface 32 similarly to the case of FIG. 4A, since the thrust receiver surface 32 has a crown shape. As a result, a necessary dynamic pressure in the thrust direction is produced also in this case when the shaft 301 rotates, and the shaft 301 is maintained in the non-contact state with the thrust receiver surface 32, similarly to the case of FIG. 4A.

In the first embodiment, the convexity (i.e. the height of the crown) of the center portion of the thrust receiver surface 32 relative to the peripheral portion is about 5-20 $\mu$m. Consequently, the degrees of square of the insert member 28 and the shaft end surface 26 of the subject invention can be two to four times less accurate compared with a conventional apparatus and still provide an effective fluid bearing.

The reason that no shallow groove is formed in the center portion 33 of the thrust receiver surface 32 is as follows. Since the thrust receiver surface 32 has a crown shape, the dynamic pressure in the periphery of the thrust receiver surface 32 becomes small, and hence an intensity of a floating force of the shaft 21 decreases. Therefore, during a certain time after starting of the apparatus, or when an external disturbing force is applied in the thrust direction, there is the fear that the shaft end surface 26 will come into contact with the thrust receiver surface 32. To decrease abrasion and wear owing to such contact, a surface area of the center portion where the contact occurs most easily is made as large as possible. For this purpose, no shallow groove is formed in the center portion 33 of the thrust receiver surface 32.

Figure 5:
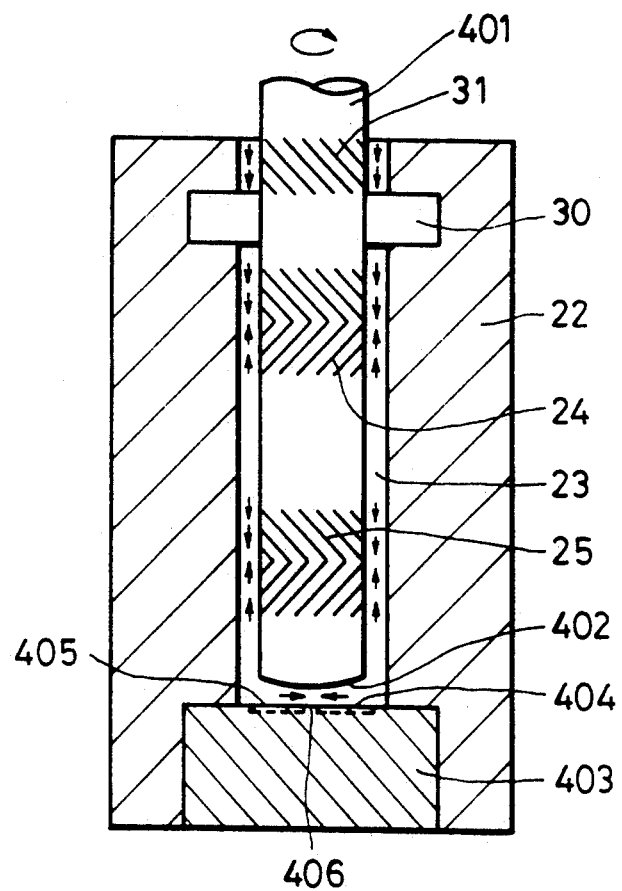
FIG. 5 is a cross-sectional view of of a second embodiment of a dynamic pressure bearing apparatus according to the present invention.

FIG. 5 shows the structure of a second embodiment of the present invention.

In FIG. 5, a shaft end surface 402 of a rotary shaft 401 has a crown shape convexed toward an insert member 403. A shallow groove 404 of a spiral shape is formed on a thrust receiver surface 405. A center portion 406 of the thrust receiver surface 405 does not have the shallow groove thereon. The same reference numerals as those shown in FIG. 2 designate the same members as shown in FIG. 5. The thrust receiver surface 405 is formed flat, but the shapes of the shallow groove 404 and the center portion 406 are the same as those shown in FIG. 3.

The operation of the second embodiment is basically the same as that of the first embodiment.

When the shaft 401 rotates, a dynamic pressure in the radial direction is generated by the action of the first shallow grooves 24 and 25 (see the pressure curve shown in FIG. 1B). Due to the dynamic pressure, the shaft 401 and the sleeve 22 are maintained in the non-contact state. At the same time, a dynamic pressure in the thrust direction is caused by the dint of the second shallow groove 404 (see the pressure curve shown in FIG. 1C), and due to this dynamic pressure the shaft 401 floats above the thrust receiver surface 405. Thus, the shaft 401 and the thrust receiver surface 405 are maintained in the non-contact state.

Figure 6:
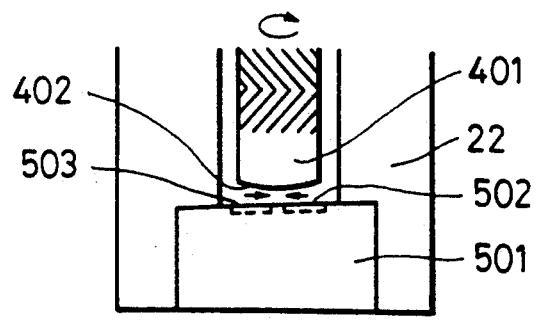
FIG. 6 is a partial view for explaining the operation of the second embodiment of FIG. 5 in a special case.

FIG. 6 shows a case where the surface of an insert member 501 is inclined relative to the inner diameter center axis of the sleeve 22. Reference numeral 502 is a second shallow groove, and reference numeral 503 is a thrust receiver surface.

Even when the thrust receiver surface 503 is inclined, a position where the thrust receiver surface 503 and the shaft end surface 402 are nearest to each other is in the vicinity of the center portion of the thrust receiver surface 503 since the shaft end surface 402 has a crown shape. As a result, a necessary dynamic pressure in the thrust direction occurs when the shaft 401 rotates, and the shaft 401 is maintained in the non-contact state with the thrust receiver surface 503.

In the second embodiment, the convexity of the center portion of the shaft end surface 402 relative to the peripheral portion is about 5-20 $\mu$m. Consequently, the degrees of square of the insert member 403 and the shaft end surface 402 can be two to four times less accurate than a conventional apparatus, similarly to the first embodiment.

In the above-discussed embodiments, no shallow groove is formed on the center portion of the thrust receiver surface, but a shallow groove may be formed on the center portion where a floating force in the thrust direction is so sufficient that there is only a small possibility that the shaft end surface will come into contact with the thrust receiver surface while rotating.

Further, an insert member may be formed with a sleeve body as a unit.

Thus, as described in the foregoing, the shape of a thrust receiver surface on which a spiral shallow groove is formed or a shaft end surface of a rotary shaft opposed to the thrust receiver surface is made convex or crown-shaped, so that the square ends of the thrust receiver surface and the shaft end surface do not have to be precisely machined. Therefore, the fabrication of a dynamic pressure bearing of the present invention becomes easy, and the cost therefor can be lowered. Moreover, it becomes possible to form the thrust receiver surface with plastics.

While there has been shown and described what are considered preferred embodiments of the present invention, it will be apparent to those skilled in the art that various changes and modifications may be made therein without departing from the invention as defined by the following claims.

What is claimed is:

1. A dynamic pressure bearing apparatus comprising:
   a rotary shaft having a shaft end surface and a radial surface;
   a sleeve for rotatably supporting said rotary shaft in a fluid, said sleeve having an end portion and a thrust receiver surface facing said shaft end surface;
   first generating means, formed on said thrust receiver surface, for generating a dynamic pressure in a thrust direction, said first generating means comprising a shallow spiral groove; and
   second generating means, formed on said radial surface of said rotary shaft, for generating a dynamic pressure in a radial direction, wherein
   one end of said shaft end surface and said thrust receiver surface is shaped into a convex form having a central portion forming its highest point and being surrounded by a peripheral portion and the other end of said shaft end surface and said thrust receiver surface is substantially perpendicular to an axis of rotation of said rotary shaft.

2. A dynamic pressure bearing apparatus according to claim 1, wherein said first generating means is formed on said peripheral portion of said thrust receiver surface.

3. A dynamic pressure bearing apparatus according to claim 1, wherein said thrust receiver surface is formed of plastic material.

4. A dynamic pressure bearing apparatus according to claim 1, wherein a difference in height between said central portion and said peripheral portion of said convex form is 2-20 $\mu$m.

5. A dynamic pressure bearing apparatus according to claim 1, wherein said thrust receiver surface is shaped into said convex form.

6. A dynamic pressure bearing apparatus according to claim 1, wherein said second generating means comprises a shallow herringbone groove.

7. A dynamic pressure bearing apparatus according to claim 1, wherein said sleeve comprises a sleeve body and an insert member, and said thrust receiver surface is formed on a surface of said insert member.

8. A dynamic pressure bearing apparatus comprising:
   a rotary shaft having a shaft end surface;
   a sleeve for rotatably supporting said rotary shaft, said sleeve having a thrust receiver surface facing said shaft end surface; and
   generating means for generating a dynamic pressure in a thrust direction, said generating means comprising a shallow spiral groove; wherein
   one end of said shaft end surface and said thrust receiver surface is shaped into a convex form and the other end of said shaft end surface and said thrust receiver surface is substantially perpendicular to an axis of rotation of said rotary shaft.

9. A dynamic pressure bearing apparatus according to claim 8, wherein said convex form has a central portion forming its highest point and being surrounded by a peripheral portion.

10. A dynamic pressure bearing apparatus according to claim 9, wherein said generating means is formed on said peripheral portion of said thrust receiver surface.

11. A dynamic pressure bearing apparatus according to claim 9, wherein said thrust receiver surface is formed of plastic material.

12. A dynamic pressure bearing apparatus according to claim 9, wherein a difference in height between said central portion and said peripheral portion of said convex form is 2-20 $\mu$m.

13. A dynamic pressure bearing apparatus according to claim 8, wherein said sleeve comprises a sleeve body and an insert member, and said thrust receiver surface is formed on a surface of said insert member.

14. A dynamic pressure bearing apparatus according to claim 8, wherein said thrust receiver surface is shaped into said convex form.

15. A dynamic pressure bearing apparatus, comprising:
   a rotary shaft having a shaft end surface and a radial surface;
   a sleeve for rotatably supporting said rotary shaft in a fluid, said sleeve having an end portion and a thrust receiver surface facing said shaft end surface;
   first generating means, formed on said thrust receiver surface, comprising a shallow spiral groove for generating a dynamic pressure in a thrust direction; and
   second generating means, formed on said radial surface of said rotary shaft, for generating a dynamic pressure in a radial direction, wherein one end of said shaft end surface and said thrust receiver surface is shaped into a convex form and the other end of said shaft end surface and said thrust receiver surface is substantially perpendicular to an axis of rotation of said rotary shaft.

16. A dynamic pressure bearing apparatus according to claim 15, wherein said sleeve comprises a sleeve body and an insert member, and said thrust receiver surface is formed on a surface of said insert member.

17. A dynamic pressure bearing apparatus according to claim 15, wherein said second generating means comprises a shallow herringbone groove.

18. A dynamic pressure bearing apparatus according to claim 15, wherein said thrust receiver surface is shaped into said convex form.

* * * * *